United States Patent [19]

Hayashi et al.

[11] Patent Number: 4,934,142
[45] Date of Patent: Jun. 19, 1990

[54] EXHAUST EMISSION CONTROL DEVICE FOR A DIESEL ENGINE

[75] Inventors: Kotaro Hayashi, Susono; Tokuta Inoue, Mishima; Sumio Ito, Gotenba; Kiyoshi Kobashi, Mishima; Shinichi Takeshima, Susono, all of Japan

[73] Assignee: Toyota Jidosha Kabushiki Kaisha, Japan

[21] Appl. No.: 281,048

[22] Filed: Dec. 7, 1988

[30] Foreign Application Priority Data

Dec. 16, 1987 [JP] Japan .................. 62-316108

[51] Int. Cl.$^5$ .................. F01N 3/02
[52] U.S. Cl. .................. 60/297; 55/75; 55/316; 55/389; 55/DIG. 30; 60/311; 422/169; 422/174; 423/213.7; 423/215.5; 423/245.1
[58] Field of Search .................. 60/297, 311; 422/169, 422/174; 423/213.2, 213.7, 542, 539, 215.5, 245.1; 55/75, 316, 389, DIG. 30

[56] References Cited

U.S. PATENT DOCUMENTS

| 3,346,328 | 10/1967 | Sergeys | 423/213.2 |
|---|---|---|---|
| 4,054,518 | 10/1977 | Miller | 60/297 |
| 4,297,328 | 10/1981 | Ritscher | 423/245.1 |
| 4,345,431 | 8/1982 | Suzuki | 60/297 |
| 4,455,393 | 6/1984 | Domesle et al. | |
| 4,661,329 | 4/1987 | Suzuki | 423/213.2 |
| 4,795,482 | 1/1989 | Gioffre | 55/389 |

FOREIGN PATENT DOCUMENTS

| 3538107 | 4/1987 | Fed. Rep. of Germany | 60/297 |
|---|---|---|---|
| 3642018 | 6/1987 | Fed. Rep. of Germany | |
| 5466 | 1/1980 | Japan | 60/297 |
| 62-5820 | 1/1987 | Japan | |
| 62-6416 | 1/1987 | Japan | |
| 174519 | 7/1987 | Japan | 60/311 |
| 62-178709 | 8/1987 | Japan | |

Primary Examiner—Douglas Hart
Attorney, Agent, or Firm—Oliff & Berridge

[57] ABSTRACT

An exhaust emission gas control device having a first filter trapping particulates contained in an exhaust gas, and a second filter removing offensive odor components in the exhaust gas. The first filter is a honeycomb type having a cordierite substrate on which $\tau$-alumina is coated. The second filter is provided downstream of the first filter, and is formed by an ion-exchange of copper on a synthetic zeolite rich in silica to form copper ions thereon.

12 Claims, 3 Drawing Sheets

EXHAUST EMISSION CONTROL DEVICE FOR A DIESEL ENGINE

BACKGROUND OF THE INVENTION

1. Field of the Invention

The present invention relates to an exhaust emission control device for removing components having an offensive odor and particulates contained in an exhaust gas of a Diesel engine.

2. Description of the Related Art

In a conventional exhaust emission control device, as disclosed in Japanese Unexamined Utility Model Publication No. 62-5820, a particulate filter is provided in an exhaust system, and a filter for removing an offensive odor component such as aldehydes from the exhaust gas is provided downstream of the particulate filter. This filter for removing an offensive odor component is constituted by coating an offensive odor absorbing agent such as $\pi$-alumina on a cordierite substrate, and carrying a catalyst such as platinum and palladium on an end portion of the substrate downstream of the coated portion. The offensive odor component is absorbed by the absorbing agent at a low temperature, and then is separated from the absorbing agent at a high temperature to be oxidized by the catalyst and discharged to the atmosphere together with an offensive odor component such as unburnt hydrocarbons (HC) discharged from the engine, which HC is also oxidized by the catalyst.

In the conventional exhaust emission control device, since the offensive odor removing filter is manufactured by applying the catalyst on an end portion of the filter, which is constituted coating the absorbing agent on a surface of the cordierite substrate, the manufacturing process is complicated. But, if the absorbing agent and the catalyst are provided on different substrates, another container for housing a catalyst must be provided, and thus the construction is complex. Further, since an air-fuel ratio of the exhaust gas of a Diesel engine is usually lean, the above described exhaust emission control device cannot remove nitrogen oxides (NOx).

SUMMARY OF THE INVENTION

An object of the present invention is to provide an exhaust emission control device which removes particulates contained in the exhaust gas, and also removes an offensive odor component by an absorbing action or oxidation and NOx by a reduction action.

Another object of the present invention is to provide an exhaust emission control device having the above function, and having a simple construction which is easily manufactured.

According to the present invention, there is provided an exhaust emission control device comprising a first filter provided in an exhaust system of an engine to collect particulates contained in an exhaust gas, and a second filter provided downstream of the first filter to absorb an offensive odor component. The second filter is formed by an ion-exchange of copper ions of copper carried on a zeolite.

BRIEF DESCRIPTION OF THE DRAWINGS

The present invention will be more fully understood from the description of the preferred embodiment of the invention set forth below, together with the accompanying drawings, in which.

DESCRIPTION OF THE PREFERRED EMBODIMENTS

Figure 1:
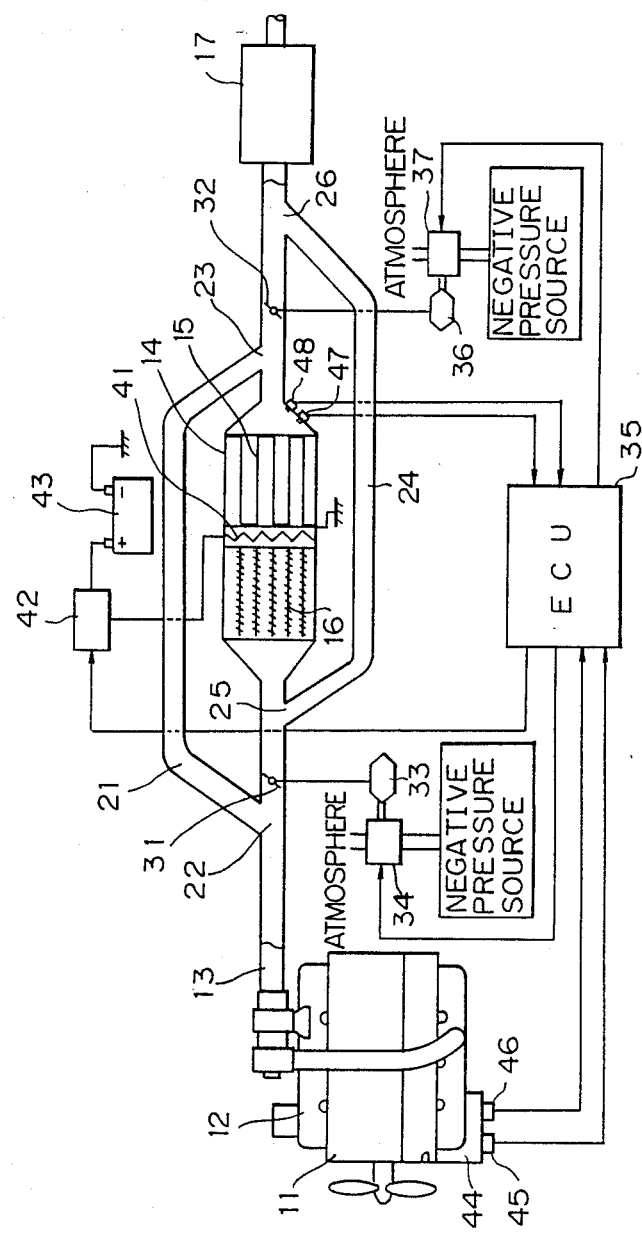
FIG. 1 is a sectional view of a first embodiment of the present invention.

The present invention will now be described with reference to the embodiments shown in the drawings.

FIG. 1 shows a first embodiment of the present invention. In the drawing, an exhaust pipe 13 connected to an exhaust manifold 12 of a Diesel engine 11 is provided with a large diameter portion 14 in which a first filter 15 for removing particulates contained in the exhaust gas and a second filter 16 for removing offensive odor components are provided. The particulates comprise carbon particulates and liquid HC absorbed on the surfaces of the carbon particles, and the offensive odor components are unburned fuel and oxidized matter such as aldehyde. A muffler 17 is positioned downstream of the large diameter portion 14.

A first branch pipe 21 connects a first connecting portion 22 located between the engine 11 and the large diameter portion 14 to a second connecting portion 23 located between the large diameter portion 14 and the muffler 17, and a second branch pipe 24 connects a third connecting portion 25 located between &.he first connecting portion 22 and the large diameter portion 14 to a fourth connecting portion 26 located between the second connecting portion 23 and the muffler 17. A first valve 31 is provided between the first and third connecting portions 22 and 25, and a second valve 32 is disposed between the second and fourth connecting portions 23 and 26.

An actuator 33 for opening and closing the first valve 31 has a conventional diaphragm type construction and is operated by introducing a negative pressure or an atmospheric pressure therein through a negative pressure control valve 34. The negative pressure control valve 34 is controlled by an electronic control circuit (ECU) 35 including a microcomputer, to selectively connect a negative pressure source or the atmosphere to actuator 33. An actuator 36 provided for opening and closing the second valve 32 also has a diaphragm type construction, and is operated by a negative pressure or atmospheric pressure fed through a negative pressure control valve 37 controlled by the ECU 35. The first and second valves 31 and 32 are normally closed, but when the first filter 15 is regenerated, the first valve 31 is opened to a predetermined degree and the second valve 32 is fully opened.

For a regeneration of the first filter 15, i.e., for burning particulates trapped therein, an electric heater 41 is provided between the first filter 15 and the second filter 16, and is connected to a battery 43 through a relay 42. The relay 42 is opened and closed by the ECU 35, and when the filter is to be regenerated, supplies an electric current to activate the heater 41 and burn the particulates trapped in the filter 15. The regeneration of the filter 15 is carried out in accordance with signals from an engine revolution sensor 45 and accelerator position sensor 46 mounted on a fuel injection pump 44, an exhaust back pressure sensor 47, and an exhaust temperature sensor 48, as is well known.

The first filter 15 is a honeycomb type filter having a cordierite substrate which is formed by alternatively disposing first porous cells having inlet portions which are closed by plugs, and second porous cells having outlet portions which are closed by plugs. A $\tau$-alumina agent for absorbing offensive odor components such as HC is coated on a surface of the cordierite substrate, and a catalyst such as copper or silver is carried on a surface of the $\tau$-alumina agent to lower the temperature required for igniting particulates trapped in the first filter 15 when the particulates are burned to regenerate the first filter 15.

The second filter 16 is made by coating a surface of a monolith type ceramic with a synthetic zeolite rich in silica and carrying an ion-exchanged $Cu^{2+}$.

The method of making the filter 16 is described in detail below. First, 100 parts of zeolite and 80 parts of silica sol together with water and nitric acid are ball-milled to produce a wash coat slurry, and then a 1300 cc honeycomb substrate of cordierite and having 300 cells per 1 $m^2$ is immersed in the slurry. The honeycomb's substrate is then taken out the slurry and surplus slurry removed therefrom by blowing compressed air thereover, and the honeycomb substrate is dried to remove free water. The honeycomb substrate is then burned for one hour at 500° C., and a 50 $\mu m$ coating of zeolite is applied thereon. The thus obtained filter material coated with zeolite is soaked in an aqueous copper acetate solution of 0.02 mol/l for 24 hours, dried, and then burned at 500° C. for one hour, to cause an ion-exchange of the copper in the solution to form $Cu^{2+}$ on the surface of the zeolite. In this embodiment, the ion-exchange ratio is 89%, and the amount of ions carried on the filter material is 20 g/l.

The operation of the filter of this embodiment is described below.

Usually, the first and second valves 31 and 32 are fully closed, and therefore, exhaust gas flows into the first branch pipe 21 from the first connecting portion 22, changes the direction of flow at the connecting portion 23, and flows into the large diameter portion 14. Accordingly, the exhaust gas is purified while flowing through the first and second filters 15 and 16, flows into the second branch pipe 24 from the third connecting portion 25, and is discharged to the atmosphere through the fourth connecting portion 26 and the muffler 17.

In this operation, particulates and catalytic toxins such as tar, sulfur and phosphorus contained in the exhaust gas are trapped by the first filter 15, and offensive odor components such as unburnt fuels having a high boiling point are absorbed by the first filter 15. Offensive odor components such as aldehydes having a low boiling point are absorbed by the zeolite of the second filter 16 when an exhaust gas temperature is low (lower than or equal to 200° C.) upon engine start up and during idling, and further, a discharge of while smoke and blue smoke are prevented by the zeolite. When the exhaust gas temperature is raised to higher than about 200° C., the offensive odor components absorbed to the zeolite are separated therefrom, are oxidized due to a catalytic action of the zeolite, and are charged in a non-odorous state. When the exhaust temperature is raised higher, offensive odor components such as aldehyde and unburned fuel are completely oxidized due to a catalytic action of the zeolite.

Although an air-fuel ratio of exhaust gas of a Diesel engine is usually lean (A/F is higher than 20) and, therefore, the exhaust gas contains a relatively large amount of oxygen, since $Cu^{2+}$ is activated as a catalyst when the exhaust temperature becomes relatively higher, NOx contained in the exhaust gas is deoxidized and reduced by $Cu^{2+}$. The deoxidization ratio of NOx reaches maximum value when the temperature is between 350° and 400° C.

When the amount of particulates trapped in the first filter 15 reaches a predetermined value, the particulates are ignited by the electric heater 41 and burnt, and thus a regeneration of the filter 15 is carried out. In this regenerating operation, the first valve 31 is opened to a predetermined degree, and the second valve 32 is fully opened, so that a direction of flow of exhaust gas through the filter 15 is the reverse of that in which the particulates are collected. In the regenerating operation, a flow rate of the exhaust gas in the filter 15 is about 1/10 of the total flow rate of the exhaust gas. Note that, when the filter 15 is regenerated, the filter 15 is protected from damage by overheating by the reversal of the direction of flow of the exhaust gas through the filter 15.

As described above, according to this embodiment, particulates contained in the exhaust gas are trapped by the first filter 15, and when the amount of trapped particulates reaches a predetermined value, the particulates are burnt, and thus the first filter 15 is regenerated. Since not only particulates bu&: also catalytic toxins such as tar are trapped by the first filter 15, a reduction of the performance of the zeolite of the second filter 16 is prevented. Offensive odor components such as unburnt fuel contained in the exhaust gas are absorbed by the first filter 15 in a low temperature condition, and offensive odor components such as aldehyde are absorbed in the zeolite of the second filter 16, and in a high temperature condition, are separated from the zeolite and oxidized by the catalytic action of the zeolite. Further, in the high temperature condition, offensive odor components such as unburnt fuel are also oxidized by the zeolite, and NOx contained in the exhaust gas is deoxidized and reduced by the $Cu^{2+}$ on the zeolite.

The second filter 16 for removing offensive odor components does not have a conventional construction in which a catalyst is carried on only an end portion of a filter in which alumina is coated on a cordierite substrate, but has a novel construction in which $Cu^{2+}$ is ion-exchanged to be carried out on the filter material in which zeolite is coated on a cordierite substrate. Further, the $Cu^{2+}$ can be carried on any portion of the filter, i.e., over the entire surface of the filter or on only a part thereof whereat it is easy to carry out a treatment for forming the $Cu^{2+}$, and therefore, the second filter 16 can be easily manufactured.

Figure 2:
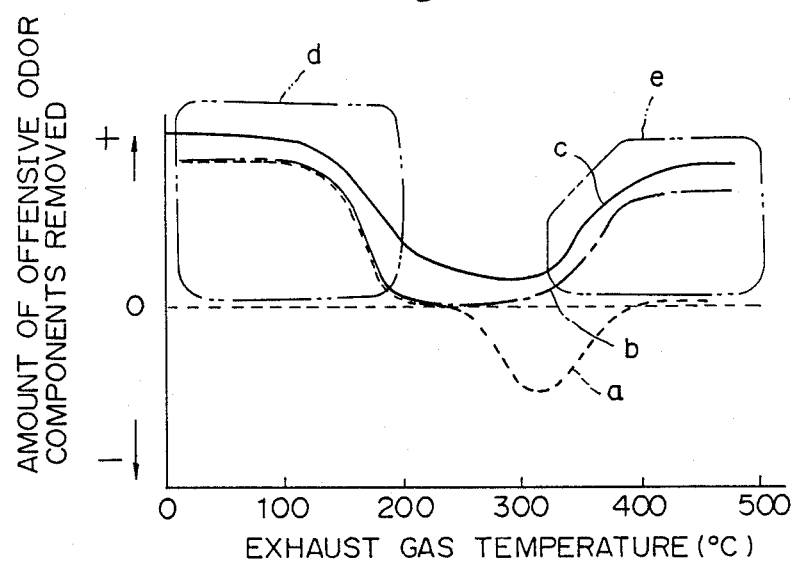
FIG. 2 is a graph showing the effects of the first embodiment and first and second comparative examples.

FIG. 2 shows a relationship between an exhaust temperature and the amount of offensive odor components removed in the embodiment of the present invention and in first and second comparative examples.

Figure 3:
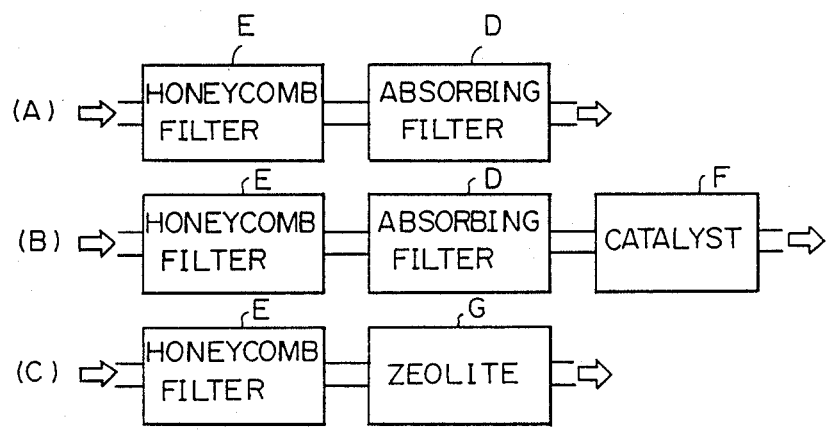
FIG. 3 is a schematic view of the constructions of the first embodiment and the first and second comparative examples; and, FIG. 4 is a sectional view of a second embodiment of the present invention.

The construction of the first comparative example, as shown in FIG. 3 (A), is such that a 1300 cc absorbing filter D is provided downstream of a 2500 cc honeycomb filter E, which is the same as the filter 15 of the embodiment of the present invention. The absorbing filter is constituted by housing activated carbon granules 5 mm in diameter in a container together with a porous separator, and does not contain a zeolite. The construction of the second comparative example, as shown in FIG. 3 (B), is such that a 2000 cc catalyst F is provided downstream of the honeycomb filter E and the absorbing filter D, which are the same as the filter E and D of the first comparative example. The catalyst F is made by coating τ-alumina on a honeycomb type cordierite substrate and applying platinum and palladium to the substrate. FIG. 3 (C) schematically shows the embodiment of the present invention. In this drawing, a zeolite filter G (the same as the second filter 16) carrying ion-exchanged $Cu^{2+}$ is provided downstream of a honeycomb filter E (the first filter 15, and the same as the filter E of the first and second comparative examples).

An experiment was carried out wherein the comparative examples and the embodiment of the present invention were attached to an exhaust pipe of a direct injection type 3400 cc Diesel engine, the engine was allowed to idle (600 rpm) for 5 minutes, then driven at 1000 rpm for 5 minutes, and then driven for 15 minutes at 1500 rpm, 2000 rpm, 2500 rpm, and 3000 rpm, respectively.

An understood from FIG. 2, when the exhaust temperature was lower than about 150° C., the first and second comparative examples and the embodiment of the present invention effectively removed offensive odor components, but when the exhaust gas temperature was raised to about 300° C., as shown by a broken line a, the amount of offensive odor components removed became a negative value in the first comparative example, as offensive odor components were separated from the filter. Under the above conditions, since the offensive odor components separated from the filter were purified by the catalyst F in the second comparative example, as shown by a chain line b, the amount of offensive odor components removed did not become a negative value, and if the exhaust temperature was further raised, the purifying performance of the catalyst F was increased.

On the other hand, in the embodiment of the present invention, as shown by a solid line c, although the amount of offensive odor components removed was reduced when the exhaust temperature was between 200° and 300° C., a satisfactory purifying performance was obtained in a low temperature area and in a high temperature area. Note that reference d shows an area in which offensive odor components are absorbed by the filter, and reference e shows an area in which offensive odor components are purified by the catalyst.

The ratio of NOx removal in the above experiment was 2% in the first comparative example, 3% in the second comparative example, and 42% in the embodiment of the present invention.

Figure 4:
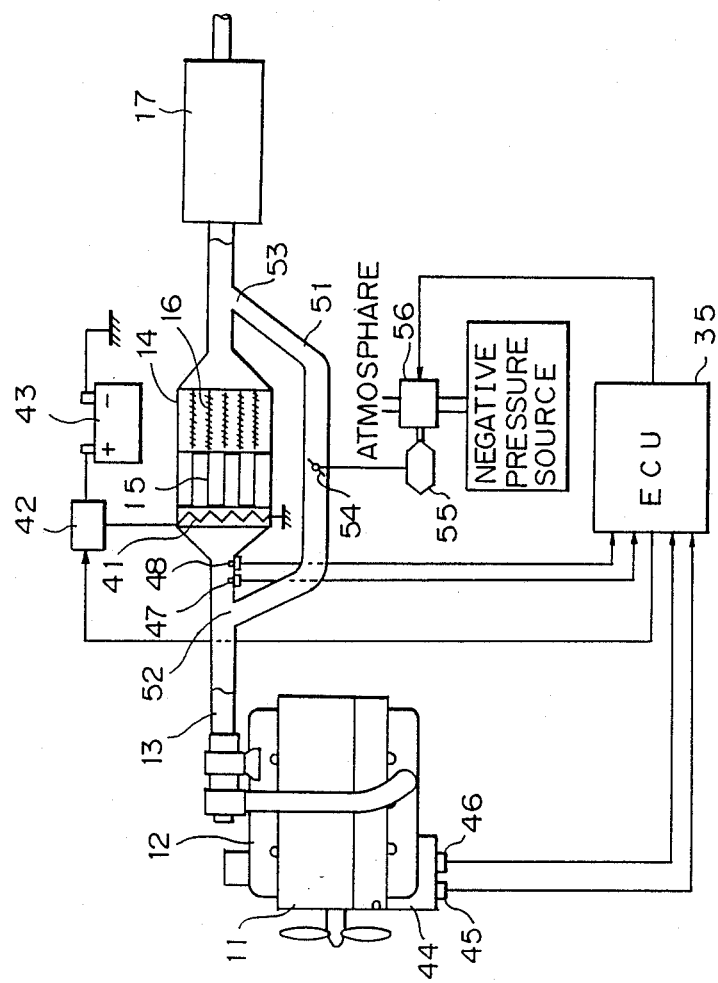

FIG. 4 shows a second embodiment of the present invention.

In this second embodiment, a branch pipe 51 connects a first connecting portion 52 located between the engine 11 and the large diameter portion 14 to a second connecting portion 53 located between the large diameter portion 14 and the muffler 17. A valve 54 is provided in the branch pipe 51 and is open and closed by an actuator 55, to which is fed a negative pressure or atmospheric pressure through a negative pressure control valve 56 to control the valve 54. The first filter 15 is provided closer to the first connecting portion 52 than to the second filter 16, and the electric heater 41 is provided at an end face close to the first connecting portion 52 of the first filter 15. The remaining construction is the same as that of the first embodiment.

In this second embodiment, the valve 54 is usually closed, so that exhaust gas passes through the first and second filters 15 and 16 and the exhaust gas emission is controlled. When the first filter 15 is regenerated, the valve 54 is open in such a manner that a flow rate of exhaust gas flowing through the filters 15 and 16 is about 1/10 of the total flow rate of the exhaust gas. The operations of the filters 15 and 16 are the same as in the first embodiment, i.e., the same effect as in the first embodiment is also obtained by the second embodiment.

As described above, since the present invention is constructed in such manner that the second filter made by carrying an ion-exchanged $Cu^{2+}$ on a zeolite is provided downstream of the first filter, the exhaust emission control device removes not only particulates contained in the exhaust gas, but also offensive odor components over the entire exhaust gas temperature range. Further, this exhaust emission control device has a simple construction, and thus is easily manufactured. Still further, in the present invention, since particulates, sulfur, and phosphorous are collected by the first filter, a reduction of the performance of the second filter is prevented, and thus the durability of the second filter is improved.

What is claimed:

1. An exhaust emission control device for a diesel engine comprising:
    a housing for placement in the exhaust system of the diesel engine;
    a first filter arranged in the housing for trapping particulates in the exhaust gas, the first filter extending across the entire cross-section of the housing;
    a second filter in the housing adjacent the first filter for absorbing offensive odor components of the housing, exhaust gas and extending across the entire cross section of the housing, the second filter being formed of a zeolite carrying copper ions formed by an ion-exchange of copper thereon.

2. An exhaust emission control device according to claim 1, wherein said first filter is a honeycomb type filter having a cordierite substrate.

3. An exhaust emission control device according to claim 2, wherein said cordierite substrate is made by alternatively disposing first porous cells having inlet portions which are closed by plugs, and second porous cells having outlet portions which are closed by plugs.

4. An exhaust emission control device according to claim 3, wherein said cordierite substrate is coated with τ-alumina.

5. An exhaust emission control device according to claim 4, wherein said τ-alumina carries a catalyst to lower a temperature used for igniting particulates trapped in said first filter.

6. An exhaust emission control device according to claim 1, wherein said second filter is formed of a monolith type ceramic.

7. An exhaust emission control device according to claim 1, wherein said zeolite is a synthetic zeolite rich in silica.

8. An exhaust emission control device according to claim 1, wherein said copper ions are carried on the entire surface of said zeolite.

9. An exhaust emission control device according to claim 1, wherein said copper ions are carried on a part of the surface of said zeolite.

10. An exhaust emission control device according to claim 1, wherein the cross-sectional area of said first filter is substantially the same as that of said second filter.

11. An exhaust emission control device according to claim 1, further comprising means for forming a normal gas flow path first through said first filter and then through said second filter, and to form a regeneration gas flow path wherein at least a portion of the exhaust gas passes first through said second filter and then through said first filter.

12. An exhaust emission control device according to claim 11, wherein an electric heater is arranged in said housing between said first filter and second filter.

* * * * *